United States Patent
Cantadori

(10) Patent No.: US 12,504,341 B2
(45) Date of Patent: Dec. 23, 2025

(54) TEST BENCH FOR CHECKING THE CORRECT FUNCTIONING OF A TIGHTENING TOOL, SUCH AS A TORQUE WRENCH

(71) Applicant: ATLAS COPCO INDUSTRIAL TECHNIQUE AB, Stockholm (SE)

(72) Inventor: Alessandro Cantadori, Muggio (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 224 days.

(21) Appl. No.: 18/268,864

(22) PCT Filed: Dec. 16, 2021

(86) PCT No.: PCT/IB2021/061850
§ 371 (c)(1),
(2) Date: Jun. 21, 2023

(87) PCT Pub. No.: WO2022/137042
PCT Pub. Date: Jun. 30, 2022

(65) Prior Publication Data
US 2024/0044735 A1    Feb. 8, 2024

(30) Foreign Application Priority Data
Dec. 24, 2020 (IT) .................. 102020000032384

(51) Int. Cl.
*G01L 25/00* (2006.01)
*B25B 23/147* (2006.01)
(Continued)

(52) U.S. Cl.
CPC .......... *G01L 25/003* (2013.01); *B25B 23/147* (2013.01)

(58) Field of Classification Search
CPC . G01L 25/003; G01L 5/24; G01L 5/28; G01L 5/00; G01L 25/03; B25B 23/147;
(Continued)

(56) References Cited

U.S. PATENT DOCUMENTS 5,181,425 A * 1/1993 Livingston ............ G01L 25/003
73/862.08
2010/0270721 A1 10/2010 Liu

FOREIGN PATENT DOCUMENTS

| DE | 202008002919 U1 | 5/2008 |
| DE | 102008020043 A1 | 10/2009 |
| DE | 102012222600 A1 | 6/2014 |

OTHER PUBLICATIONS

European Patent Office; International Application No. PCT/IB2021/061850, International Preliminary Report on Patentability mailed on Mar. 21, 2023, 26 pages.
(Continued)

*Primary Examiner* — Brandi N Hopkins
(74) *Attorney, Agent, or Firm* — Kilpatrick Townsend & Stockton LLP

(57) ABSTRACT

A test bench for checking the correct functioning of a tightening tool, for example, a torque wrench, including a fixed frame, which determines a work surface on which one or more motorized cells are positioned provided with a coupling suitable for coupling with the tool head of a tightening tool, a movable frame connected to the fixed frame by a sliding element which allows the surface to be elongated along a longitudinal direction (X) of the bench for an adjustable length, the movable frame being equipped with an element for fixing the handle of the tightening tool to such movable frame, an electronic processing unit which controls these motorized cells, which is capable of imparting to the tool head of the tightening tool to be tested a rotation
(Continued)

Figure 1A:
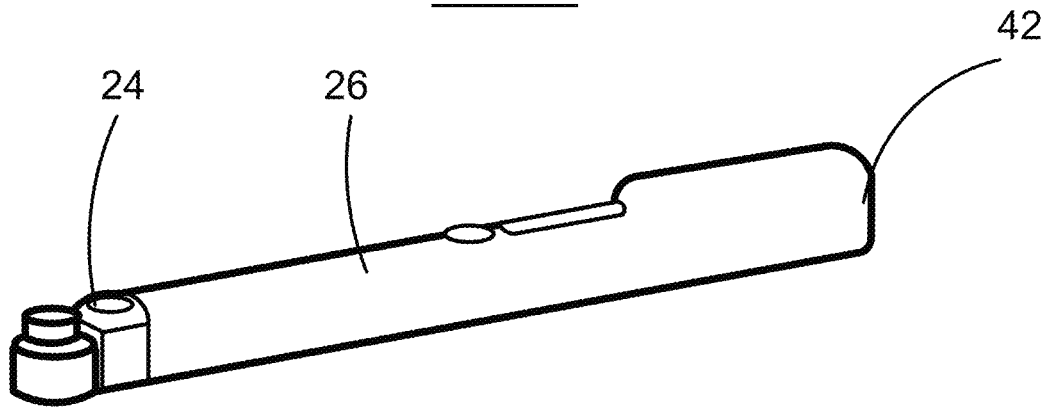

with predetermined values of tightening torque and angle of rotation.

6 Claims, 4 Drawing Sheets

(51) Int. Cl.
*G01L 5/24* (2006.01)
*G01M 13/025* (2019.01)

(58) Field of Classification Search
CPC ....... B25B 13/463; B25B 21/005; B25H 1/18; E01B 29/28; B60B 35/14; G01M 13/00; Y02E 30/30; G01B 5/255
USPC .......................................................... 73/1.12
See application file for complete search history.

(56) References Cited

OTHER PUBLICATIONS

European Patent Office; International Application No. PCT/IB2021/061850, International Search Report and Written Opinion mailed on Mar. 2, 2022, 12 pages.

* cited by examiner

Prior Art

TEST BENCH FOR CHECKING THE CORRECT FUNCTIONING OF A TIGHTENING TOOL, SUCH AS A TORQUE WRENCH

CROSS-REFERENCE TO RELATED APPLICATIONS

The present application is a § 371 National Phase Application of PCT/IB2021/061850, filed Dec. 16, 2021, which application claims priority and benefit to Italian Patent Application No. 102020000032384, filed on Dec. 24, 2020, the disclosure of each of which is incorporated herein by reference in its entirety for all purposes herein.

The present invention relates to a test bench for checking the correct functioning of a tightening tool, such as a torque wrench.

Such test benches usually comprise a plurality of hydraulic brakes, with which the instrument is associated, suitably controlled by a hydraulic circuit comprising at least one pump, which withdraws the fluid from a reservoir and provides it to a pressure regulating valve, which in turn provides it to the brakes.

Each brake is provided with measuring transducers connected to an electronic driver board, which also controls such regulating valve. The bench also comprises a computer that communicates with such board and that comprises a suitable driving program stored thereon.

Each brake simulates the conditions of a joint (e.g. a nut or screw) that must be clamped by the tightening tool to be tested.

Once an operator has selected the brake to be used for the test, the driving program is able to progressively increase the braking capacity of the brakes by adjusting the pressure, until reaching a complete stop of the rotation of the tool being tested. Such a test bench is described in patent application WO2019111146.

On this type of bench it is possible to associate a mechanical sliding structure that allows a controlled force and rotation to be imparted to a torque tool, with its tightening tool engaged in a brake of such bench. Said mechanical structure comprises a pair of longitudinal bars which can be constrained to said bench, on which at least one guide is mounted transversely, on this guide there is a support which slides by means of movement means in the transverse direction and is provided with constraint means for the tool body, so that the tool is pivoted on the brake with its tool head and can rotate to simulate a tightening of the brake when the support is moved along this guide.

The applicant has noted that in this type of test bench, tightening tools with arm lengths compatible with the length of the guides can be tested.

In fact, the rotation to the tool must be imparted by the handle of the tool itself (as happens when an operator uses the tool manually (i.e., a torque wrench), and therefore the guides must allow the support which slides by means of movement means in the transverse direction to be constrained to the handle of the wrench.

Calibration devices for torque wrenches, such as the one described in patent application US20090217773, are known which comprise a mechanical slidable structure which can be mounted on a frame of a test bench or which can operate independently and which allows a controlled force and rotation to be imparted to a torque wrench. Such a wrench has its tightening tool, or tool head, engaged in a static transducer provided with a transducer which simulates a conventional tightening of a bolt, for example.

By means of such a calibration device it is possible to compare, on the basis of a known force or torque imparted by the calibration device, the torque measured by the wrench through its sensors and the torque measured by the transducer on the brake.

All the measurements taken determine whether the wrench exerts the correct tightening torque and, if necessary, the correct tightening angle in normal use, and shows this accurately on its display. In case of discrepancies, the wrench can be recalibrated based on the measurements taken.

Standard UNI ISO 6789 of 2017 establishes the obligation to verify and calculate the uncertainty of the torque tool, together with the increase of the measurement interval, provides a very useful indication to operators regarding the reproducibility of the accuracy of their tool and at the same time makes the difference in terms of quality between tool manufacturers even more evident. Operators will have access to fundamental information about the wrench purchased: in addition to quantifying the accuracy of the wrench, which is already an indication of the quality of the wrench itself, the operator will be informed of the degree of uncertainty of the measurement made by the wrench. The higher the calculated uncertainty value, the greater the difference between the accuracy value measured during certification and the value actually applied by the operator. Those responsible for maintenance, who must work within very precise protocols, will therefore have to equip themselves with tools which ensure a very low degree of measurement uncertainty in order to be sure of adhering to those protocols. The standard specifies a method for calibrating hand-held torque tools and describes the method of calculating the measurement of calibration uncertainties.

The above standard states that force(s) shall be applied to the wrench handle at a constant radial distance. Therefore, the force exerted must always be tangent to the trajectory traversed by the wrench handle.

The fact that the application point of the force is not tangent to the trajectory of the wrench means that the force applied to the tool handle is not constant but undergoes variations which make the measurement inaccurate with respect to that indicated in the standard.

The present invention proposes to overcome the above-mentioned drawbacks by making a test bench in which the torque applied to the wrench is determined by a rotation imparted to its tool head.

One aspect of the present invention relates to a test bench having the features of the appended claim 1.

Further features of the invention are highlighted by the dependent claims.

Figure 1B:
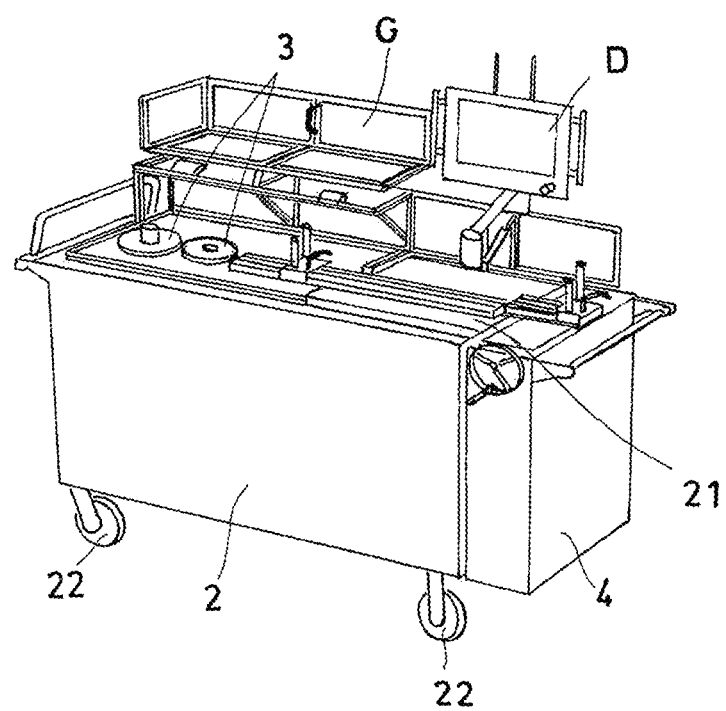
Figure 2:
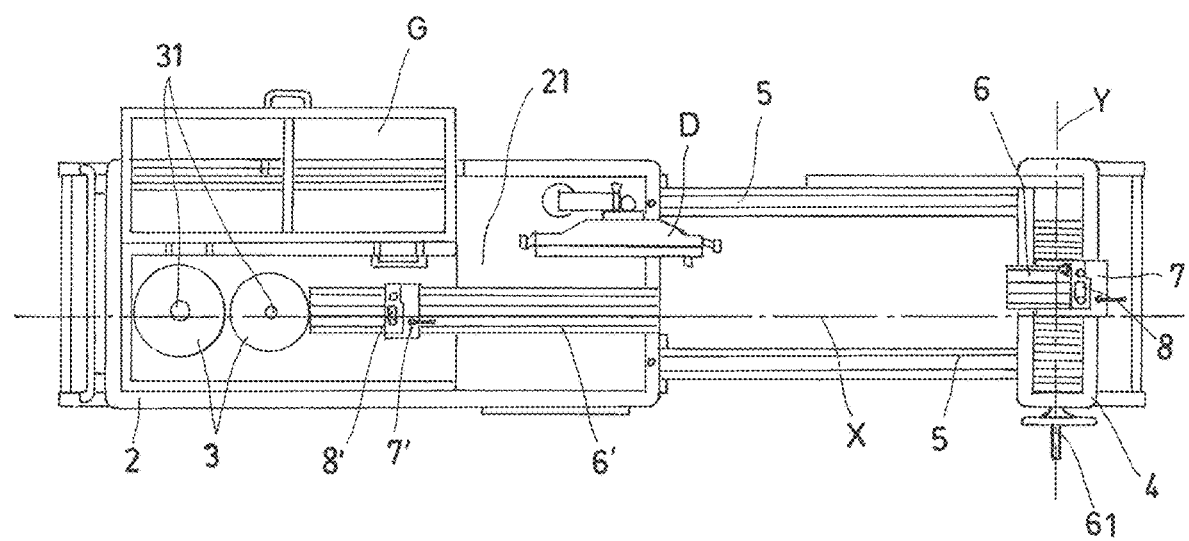
Figure 3:
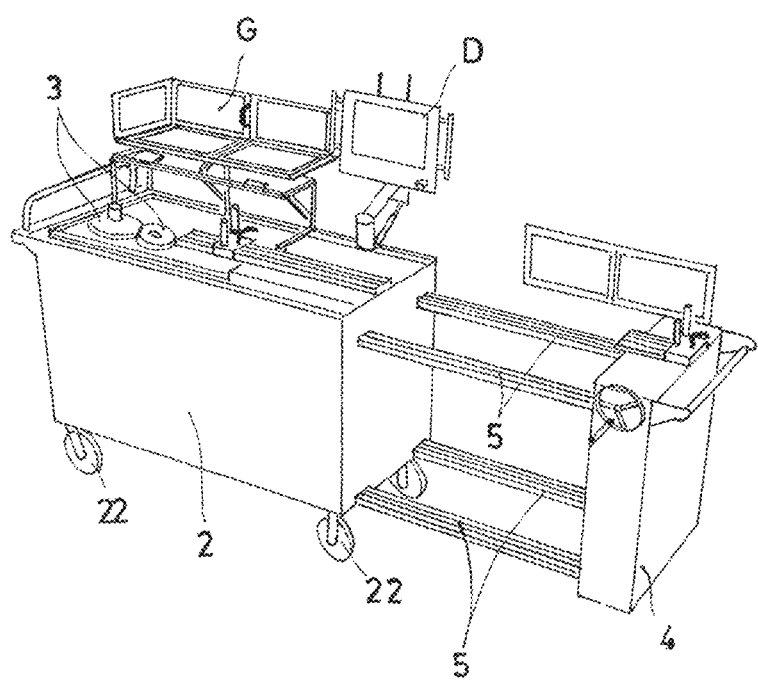
Figure 4:
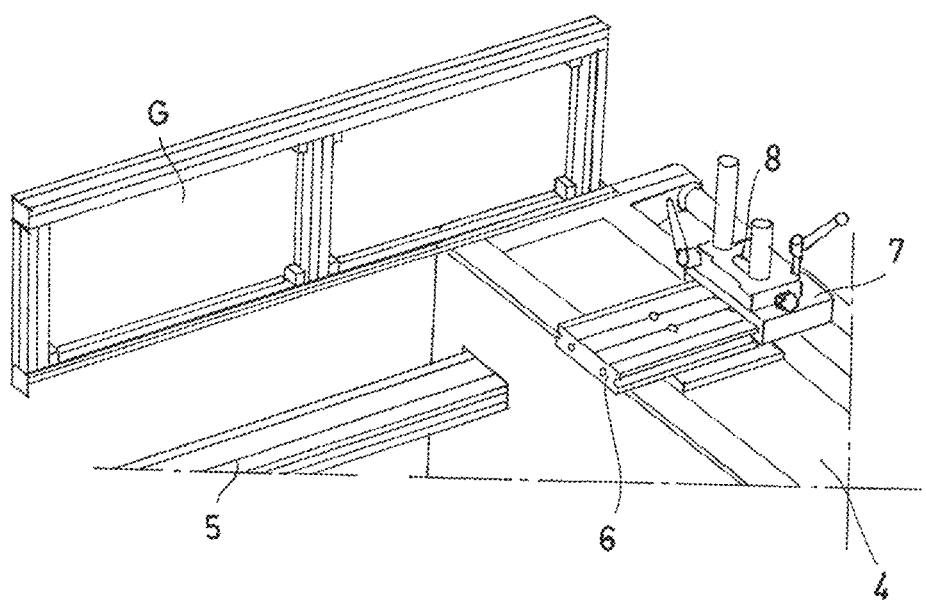

The features and advantages of the device according to the present invention will be more apparent from the following description, which is to be understood as exemplifying and not limiting, with reference to the schematic attached drawings, wherein:

FIG. 1a shows a torque wrench from the prior art, with the head portion 24 of the torque wrench 26 and the handle 42.
FIG. 1b is a perspective view of a test bench in the closed position according to the present invention;
FIG. 2 is a top view of a test bench in the open position according to the present invention;
FIG. 3 is a perspective schematic view of the bench of FIG. 2;
FIG. 4 shows an enlarged detail of the bench in the area with the motorized cells.

With reference to the aforementioned figures, the test bench according to the present invention comprises a fixed frame 2, which determines a work surface 21 on which one or more motorized cells 3 equipped with a coupling 31 capable of coupling with the tool head of a tightening tool are positioned. The bench further comprises a movable frame 4 connected to the fixed frame by means of movement means which allows the extension of the same surface along a longitudinal direction X of the bench for an adjustable length. Said movable frame is equipped with first fixing means for fixing the handle of the tightening tool to such movable frame.

Such motorized cells are capable of imparting a torque for a predetermined angle of rotation to the tool head of the torque wrench (or tightening tool) when it is clamped on the work surface with the tool head engaged in the coupling and the handle locked by such fixing means.

Depending on the length of the wrench as a whole, the movement means can position the movable frame so that the position of the wrench handle matches the fixing means placed on the movable frame. The fixed frame 2 is advantageously equipped with wheels 22 at the bottom for its movement. The bench as a whole is equipped on the work surface with a cage safety system G on both the fixed and the movable frame.

The movable frame at its base is provided with support feet used for stability and secure fixing to the ground.

The movement means comprises a plurality of elongated sliding elements 5 connected at one end to the movable frame and which are inserted into the fixed frame.

When these elements are fully inserted into the fixed frame, the movable and fixed frames are essentially joined.

According to an aspect of the present invention the first fixing means comprise a first longitudinal guide 6, on which a slide 7 equipped with locking means 8 of the handle slides in the longitudinal direction with respect to the bench of the tightening tool to be tested.

The first guide 6 and the slide 7 can also move in the transverse direction Y by means of an adjustment mechanism, for example a worm screw operated by a crank 61 placed on the movable frame. This transverse movement allows torque wrenches with ratchets to be tested on the fixed head. Considering that the rotation system of the motorized cells has a system of teeth positioned with an angular displacement of approximately 3°, it is likely that the handle of the wrench does not fall exactly inside the locking system 8. The longer the key is, the more the handle may be displaced in relation to the central axis of the bench. Thanks to this transverse movement of the guide and the slide, it is possible to adjust the locking system of the wrench handle along a longitudinal axis and adapt it to the position of the torque wrench axis in relation to that of the bench. This axis can be shifted by up to 3°, for example, as shown in FIG. 2.

According to an aspect of the present invention, in addition to the first guide and the first slide positioned on the movable frame, the bench also comprises a second guide 6' positioned longitudinally on the fixed frame provided with a second slide 7' provided with second locking means 8' of the handle of the tightening tool to be tested. This second slide can carry the handle of small torque wrenches, the handle of which can be attached directly to the fixed part of the frame without the need for an extension via the movable frame.

The first technical problem that is solved by the present invention relates to the ISO issue. In canonical test systems, the sliding system imparts a force to the torque wrench that is always parallel to the sliding axis and is perpendicular to the axis of the wrench in one point only. In practice, the force should move along a circular trajectory, but it does not; in fact, it moves along a linear trajectory. The present invention easily solves this technical problem since the fixing means (both the former and the latter) are used only for the initial fixing of the handle of the torque wrench, while the torque is supplied directly to the head by the motorized cell mounted under the wrench insert.

The test bench comprises an electronic processing unit (equipped with a video display D and a dedicated user interface) capable of controlling the motorized cells and interfacing with the instrument to be tested.

The cells are able to give the tool head of the tightening tool, via this electronic processing unit, a rotation with predetermined values of tightening torque and angle of rotation.

For example, if the instrument to be tested is a torque wrench, the bench can be connected to the microprocessor board of the wrench via a wired or wireless (Wi-Fi) connection.

The electronic unit of the bench imparts a controlled rotation (pre-set torque and angle) to the cell engaged with the tool head of the tightening tool and reads the corresponding values of torque and angle through the sensors on the tool itself. By comparing the data entered and the measured data, the instrument is tested in order to understand, for example, whether the instrument is calibrated or needs maintenance, repair etc. . . . one of the most important aspects of this solution, portability.

The canonical benches that are used to do this type of testing on bulky wrenches are usually fixed due to their dimensions.

The bench of the present invention has the advantage that it can be compact and become bulky only when necessary by extending the movable frame. In addition, the fact that it is compact also makes it easy to move.

The invention claimed is:

1. Test bench for checking the correct functioning of a torque wrench having a head and a handle, comprising a fixed frame (2), which determines a work surface (21) on which are positioned one or more motorized cells (3) equipped with a coupling (31) suitable for coupling with the head of the torque wrench,
a movable frame (4) connected to the fixed frame by means of movement which allows a table to be elongated along a longitudinal direction (X) of the test bench for an adjustable length, said movable frame being equipped with first fixing means for the handle of the torque wrench to such movable frame comprising a first longitudinal guide (6), on which a first slide (7) equipped with a first locking means (8) of the handle of the torque wrench slides in the longitudinal direction with respect to the bench of the torque wrench to be tested, an electronic processing unit which controls these motorized cells and which is capable of imparting to the tool head of the torque wrench to be tested a rotation with predetermined values of tightening torque and angle of rotation, characterized in that it comprises
a second guide (6') positioned longitudinally on the fixed frame (2) equipped with a second slide (7') which includes second locking means (8') of the handle of the torque wrench to be tested, and in that the handle is attached directly to the fixed part of the frame without the need for an extension via the movable frame,
and in that depending on the length of the torque wrench as a whole, the movement means can position the movable frame so that the position of the torque wrench handle matches the fixing means placed on the movable frame.

2. Test bench according to claim 1, wherein said first moving means comprise a plurality of elongated sliding elements (5) connected at one end to the mobile frame and which are inserted into the fixed frame.

3. Test bench according to claim 1, in which the first longitudinal guide (6) and the slide (7) can also move in the transverse direction (Y) by means of an adjustment mechanism.

4. Test bench according to claim 3, wherein said adjustment mechanism, for example a worm screw operated by a crank (61) placed on the movable frame.

5. Test bench according to claim 1, in which the electronic unit gives a controlled rotation with the predetermined value for torque to the motorized cell (3) engaged with the head of the torque wrench and reads a torque value through a sensor present on the torque wrench tool itself.

6. Test bench according to claim 5, in which the predetermined value for torque is compared to the torque value from the sensor.

\* \* \* \* \*